(12) United States Patent
Yan et al.

(10) Patent No.: US 12,026,088 B2
(45) Date of Patent: Jul. 2, 2024

(54) REPRODUCTION CLIENT APPLICATION ISSUE BASED ON LAYERED DATA REPLAY

(71) Applicant: INTERNATIONAL BUSINESS MACHINES CORPORATION, Armonk, NY (US)

(72) Inventors: Zhe Yan, Beijing (CN); Rong Zhao, Beijing (CN); Ke Zhang, Beijing (CN); Li Li Guan, Beijing (CN); Yuan Jin, Shanghai (CN); Jing Zhang, Shanghai (CN)

(73) Assignee: International Business Machines Corporation, Armonk, NY (US)

( * ) Notice: Subject to any disclaimer, the term of this patent is extended or adjusted under 35 U.S.C. 154(b) by 226 days.

(21) Appl. No.: 17/741,728

(22) Filed: May 11, 2022

(65) Prior Publication Data

US 2023/0367700 A1 Nov. 16, 2023

(51) Int. Cl.
*G06F 11/36* (2006.01)
(52) U.S. Cl.
CPC ................... *G06F 11/3684* (2013.01)
(58) Field of Classification Search
USPC .......................................... 717/135
See application file for complete search history.

(56) References Cited

U.S. PATENT DOCUMENTS

| | | | |
|---|---|---|---|
| 10,802,847 B1 | 10/2020 | Mahapatra | |
| 2011/0296383 A1* | 12/2011 | Pasternak | G06F 11/3688 717/124 |
| 2016/0253254 A1* | 9/2016 | Krishnan | G06F 11/0766 717/124 |
| 2017/0139812 A1* | 5/2017 | Cai | G06F 8/38 |
| 2018/0032424 A1* | 2/2018 | Horesh | G06F 11/3692 |
| 2018/0203787 A1* | 7/2018 | Carey | G06F 11/3636 |
| 2021/0091998 A1* | 3/2021 | Ellis | G06F 11/302 |

(Continued)

FOREIGN PATENT DOCUMENTS

| | | |
|---|---|---|
| CN | 107391357 A | 11/2017 |
| CN | 107193734 B | 1/2021 |

OTHER PUBLICATIONS

"Bug and crash reporting for iOS and Android", Bugsee, downloaded from the internet on Feb. 3, 2022, 10 pages, <https://www.bugsee.com/>.

(Continued)

*Primary Examiner* — Qing Chen
*Assistant Examiner* — Clint Thatcher
(74) *Attorney, Agent, or Firm* — Monchai Chuaychoo

(57) ABSTRACT

An approach for assisting software developers to fill the data gap and reproducing client application issue using reported reproducing steps is disclosed. The approach involves constructing service request/response sequence (from the developer's side based on the limited data) from customer's reproducing steps and developer's running inspection result and perform UI-service mapping, redirecting service call to data simulator which replay the service request and response, and adjusting service response with multiple data sources and policies. Lastly, the approach can transform the issue to an automatic test script with the service response in a mockup function (e.g., can be used to extend test data and enhance test cases).

18 Claims, 9 Drawing Sheets

(56) References Cited

U.S. PATENT DOCUMENTS

2021/0191842 A1    6/2021    Guo
2023/0059605 A1*   2/2023    Sait M A ............. G06Q 30/016

OTHER PUBLICATIONS

"Ship your app confidently with the best quality & performance", Instabug, downloaded from the internet on Feb. 3, 2022, 6 pages, <https://instabug.com/>.

Gomez et al., "Reproducing Context-sensitive Crashes of Mobile Apps using Crowdsourced Monitoring", 2016 IEEE/ACM International Conference on Mobile Software Engineering and Systems (MobileSoft'16), May 16-17, 2016, Austin, TX, USA, pp. 88-99.

Moran et al., "Automatically Discovering, Reporting and Reproducing Android Application Crashes", arXiv:1706.01130v1 [cs.SE], Jun. 4, 2017, 12 pages.

Zhao et al., "ReCDroid: Automatically Reproducing Android Application Crashes from Bug Reports", 2019 IEEE/ACM 41st International Conference on Software Engineering (ICSE), DOI 10.1109/ICSE.2019.00030, pp. 128-139.

* cited by examiner

REPRODUCTION CLIENT APPLICATION ISSUE BASED ON LAYERED DATA REPLAY

BACKGROUND

The present invention relates generally to the field of software development, and more particularly to systems and methods for reproducing client issues associated with software applications.

One important obstacle for software developers is to resolve errors related to a deployed application and the ability to reproduce the same errors (as experienced by the client). For example, a client app (including browser app or mobile app) with issues is reported by customer can be difficult to reproduce by software developers due to many factors, such as, the devices used by clients can be different, the client application's configuration is different and the client device and/or application may contain different data. Other obstacle may include the fact that software developers are not allowed to connect to customer production system.

SUMMARY

Aspects of the present invention disclose a method, computer program product, and system for troubleshooting customer related issues associated with a software application. The computer implemented method may be implemented by one or more computer processors and may include, retrieving customer data, generating execution script based on retrieved customer data, constructing service data based on the execution script, adjusting service response based on the service data and generating test script based on the service response.

According to another embodiment of the present invention, there is provided a computer system. The computer system comprises a processing unit; and a memory coupled to the processing unit and storing instructions thereon. The instructions, when executed by the processing unit, perform acts of the method according to the embodiment of the present invention.

According to a yet further embodiment of the present invention, there is provided a computer program product being tangibly stored on a non-transient machine-readable medium and comprising machine-executable instructions. The instructions, when executed on a device, cause the device to perform acts of the method according to the embodiment of the present invention.

BRIEF DESCRIPTION OF THE DRAWINGS

Preferred embodiments of the present invention will now be described, by way of example only, with reference to the following drawings, in which.

DETAILED DESCRIPTION

Figure 1:
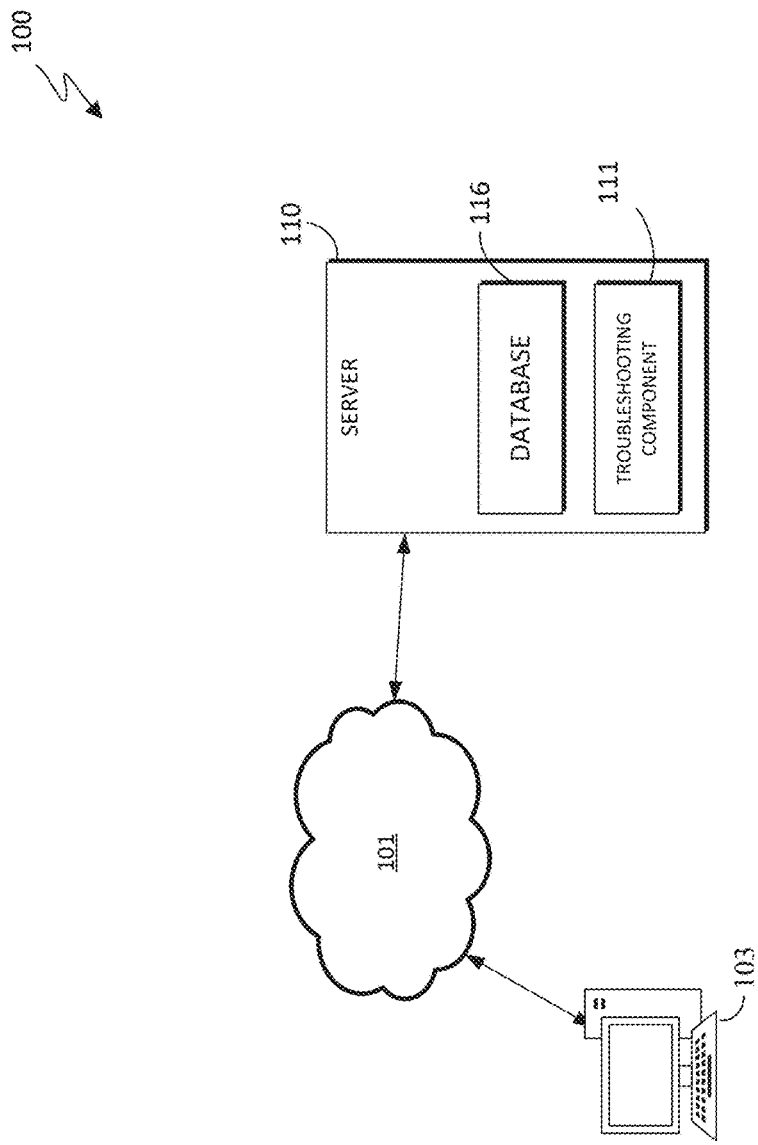
FIG. 1 is a functional block diagram illustrating a troubleshooting environment, designated as 100, in accordance with an embodiment of the present invention.

The current state as it pertains to troubleshooting software application issues (customer's software), can be difficult when software developer tries to replicate the issue. One difficulty may be attributed to the fact that the test data used by software developers is different than customer production data. For example, even when customer upload reproducing steps, snapshot, video, and log, the software developer cannot reproduce the issue using sample data, and the software developer cannot login enterprise system to get customer data. In the other hand, developer has effective tool such as devtools to monitor and collect more information, but customer cannot use it in the production environment.

Embodiments of the present invention recognizes the deficiencies and difficulty in assisting software developers to fill the data gap and reproducing client application issue using reported reproducing steps and provides an approach. In a high-level summary, the steps of the approach includes, constructing service request/response sequence (from the developer's side based on the limited data) from customer's reproducing steps and developer's running inspection result and perform UI-service mapping, redirecting service call to data simulator which replay the service request and response, and adjusting service response with multiple data sources and policies. Lastly, the approach can transform the issue to an automatic test script with the service response in a mockup function (i.e., can be used to extend test data and enhance test cases). Through this approach, developers can reproduce the reported issue locally despite the data gap. Furthermore, the approach is able to help developers to validate, reproduce and debug reported issue, provides support to locate root cause in multiple layers and able to separate data dependency from code (i.e., software code) issue.

Some embodiments of the present invention provides another approach. The alternative approach can include the following high-level summary, i) collect service request/response for different layer, ii) correlate reproducing steps with service request/response sequence, iii) transform reproducing steps to automation test script, iv) transform underlying service request/response to mockup function in test framework and v) redirect service request to data replayer which replay recorded request/response.

Advantages and capabilities of the approach can include, but it is not limited to, i) automatically reproduce issue in developer side using customer data, ii) simulate service response with recorded data, iii) enhance test case with recorded data and iv) locate code issue for multiple layers and able to separate data dependency from code issue.

Some embodiments of the present invention provides yet another approach. The alternative approach can include the following high-level summary, i) utilize customer's limited reproducing steps and developer's inspection tool and UI-service mapping to construct and restore customer's service request and response, and redirect developer app's service call to data simulator which replay the service request and response, to reproduce the issue reported by customer, ii) transforming reproducing steps to automation test script with the service response as mockup function's return value, iii) using existing techniques to analyze reproducing steps/snapshot/video/log, generate execution script and observed result, iv) running execution script in emulator step by step. Use inspection tool such as devtools to collect developer's service request/response, compare developer's UI result with customer's observed result, analyze UI-service mapping from code, update inspected response based on the mapping, redirect service call to data simulator (replay constructed response) and rerun the step(s), v) validating whether to reproduce the issue when executing the given step. If not, then analyze multiple data sources and apply multiple policies to adjust service response and rerun the step. Furthermore, in the embodiment, the data sources include but not limited to service swagger, branches in client code and test cases and the policies include boundary values, branch values, explicit error and others.

References in the specification to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments, whether or not explicitly described.

It should be understood that the Figures are merely schematic and are not drawn to scale. It should also be understood that the same reference numerals are used throughout the Figures to indicate the same or similar parts.

FIG. 1 is a functional block diagram illustrating troubleshooting environment, designated as 100, in accordance with an embodiment of the present invention. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Troubleshooting environment 100 includes network 101, developer device 103 and server 110.

Network 101 can be, for example, a telecommunications network, a local area network (LAN), a wide area network (WAN), a Universal Serial Bus (USB) network, such as the Internet, or a combination of the three, and can include wired, wireless, or fiber optic connections. Network 101 can include one or more wired and/or wireless networks that are capable of receiving and transmitting data, voice, and/or video signals, including multimedia signals that include voice, data, and video information. In general, network 101 can be any combination of connections and protocols that can support communications between server 110, developer device 103 and other computing devices (not shown) within troubleshooting environment 100. It is noted that other computing devices can include, but is not limited to, any electromechanical devices capable of carrying out a series of computing instructions.

Developer device 103 are computing devices, belonging to the development/support team that are capable of troubleshooting/debugging issues of the software application (installed by customer on their own devices), reproducing customer software related issues. Developer device 103 can include servers and desktop PC capable of executing computing programming. Any myriad of software (e.g., devTools, defect ticketing system, etc.) can be installed on developer device 103 that can aid developers to debug and reproduce customer's issues.

Server 110 can be a standalone computing device, a management server, a web server, a mobile computing device, or any other electronic device or computing system capable of receiving, sending, and processing data. In other embodiments, server 110 can represent a server computing system utilizing multiple computers as a server system, such as in a cloud computing environment. In another embodiment, server 110 can be a laptop computer, a tablet computer, a netbook computer, a personal computer (PC), a desktop computer, a personal digital assistant (PDA), a smart phone, or any other programmable electronic device capable of communicating other computing devices (not shown) within troubleshooting environment 100 via network 101. In another embodiment, server 110 represents a computing system utilizing clustered computers and components (e.g., database server computers, application server computers, etc.) that act as a single pool of seamless resources when accessed within troubleshooting environment 100.

Embodiment of the present invention can reside on developer device 103 or server 110. Server 110 includes troubleshooting component 111 and database 116.

Troubleshooting component 111 has the capability of, i) utilizing customer's limited reproducing steps and developer's inspection tool and UI-service mapping to construct and restore customer's service request and response and ii) redirect developer app's service call to data simulator which replay the service request and response in order to reproduce the issue reported by customer. Furthermore, troubleshooting component 111 can transform the reproduction steps to automation test script with the service response as mockup function's return value.

In another embodiment, troubleshooting component 111, the approach can include the following high-level summary, i) constructing service request/response sequence from reproducing steps/video/log and local running inspect result, ii) redirecting service request to data simulator which replay constructed request/response, and iii) transforming reproducing steps to automation test script, using service request/response to mockup function in test framework.

Database 116 is a repository for data used by troubleshooting component 111. Database 116 can be implemented with any type of storage device capable of storing data and configuration files that can be accessed and utilized by server 110, such as a database server, a hard disk drive, or a flash memory. Database 116 uses one or more of a plurality of techniques known in the art to store a plurality of information. In the depicted embodiment, database 116 resides on server 110. In another embodiment, database 116 may reside elsewhere within troubleshooting environment 100, provided that troubleshooting component 111 has access to database 116. Database 116 may store information associated with, but is not limited to, knowledge corpus of, code related to the software application, common errors and defects associated with the software application, swagger data, client code, test case, test data, production data, service code, client code and test case.

Figure 2:
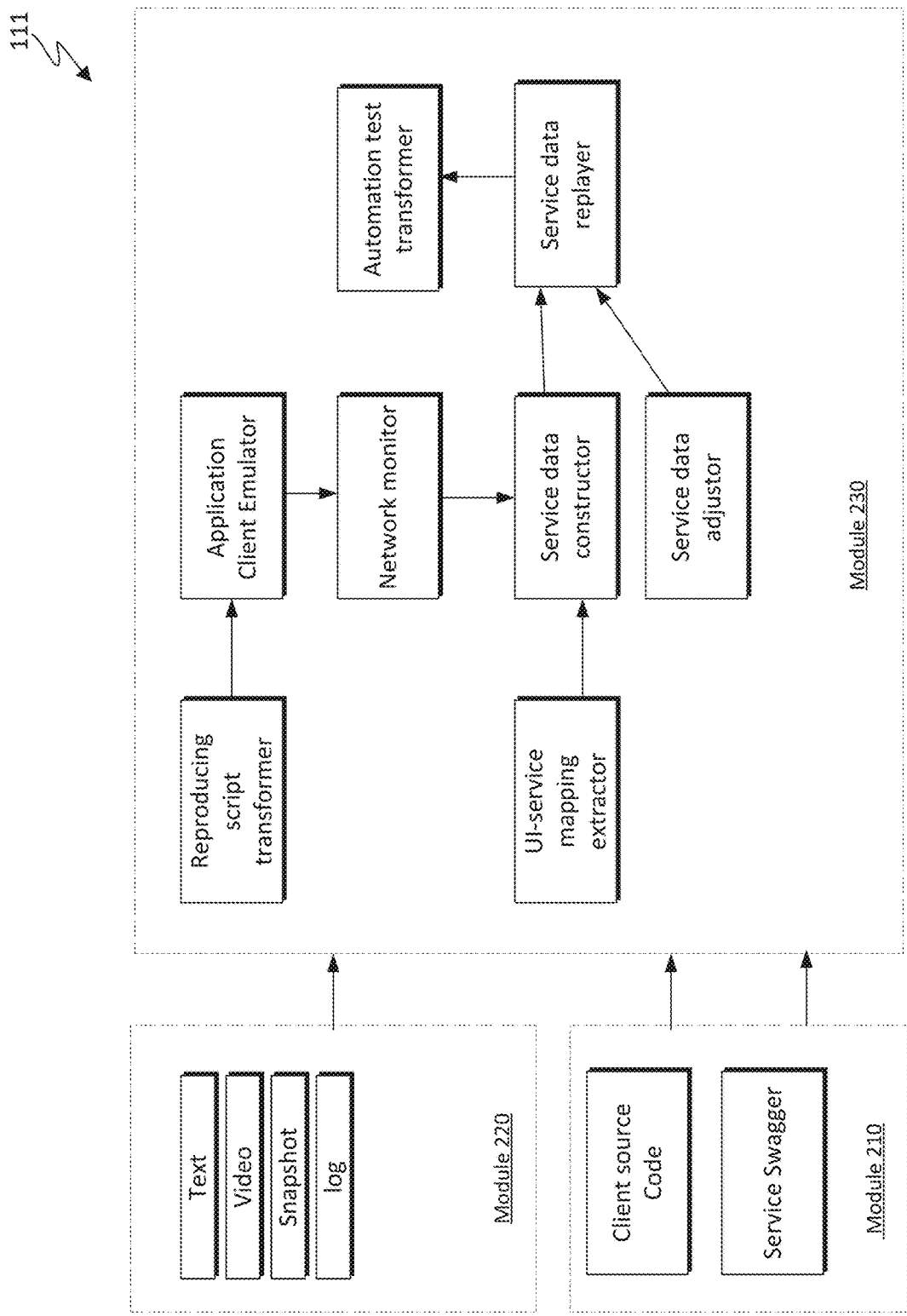
FIG. 2 illustrates modules and/or subcomponents of troubleshooting component 111, in accordance with an embodiment of the present invention.

FIG. 2 illustrates modules and/or subcomponents of troubleshooting component 111, in accordance with an embodiment of the present invention. Troubleshooting component 111 can include the following subcomponents and/or modules, module 210, module 220, and module 230.

As is further described herein below, module 210 of the present invention provides the capability to retrieve one source of data (from the customer) to be processed by module 230. For example, when customer reports an issue, the customer provides the information. The information can include, i) what is the reproducing steps, ii) what is the expected result, iii) what is the observed behavior, or iv) customer can write textual description, can upload snapshot, or video, can upload the product logs.

As is further described herein below, module 220 the present invention provides the capability of communicating and retrieving data with another alternative data sources, such as client source code, data from test case and service swagger. One reason that an alternative data source is used in addition to the data that is directly retrieved from the customer, is to enhance the debug process and reproduce the customer issue accurately. Typically, customer's reproducing steps (of their issue) do not contain enough information for the developer to reproduce the issue locally (i.e., cannot connect with customer's production environment). Thus, there is a need for addition information, such as, utilizing the product source code to analyze the mapping between UI elements with service properties and to analyze the impact of service call.

As is further described herein below, module 230 of the present invention provides the capability of, but it is not limited to, i) generating execution scripts, ii) generating test scripts with mockup data, iii) adjusting service response and iv) constructing service request/response (see 230 of FIG. 2 and/or FIG. 4 for further details).

Generation execution scripts are scripts that can be used to interpreted and executed on the browser/device of developer. The execution script is created from input data. Essentially, the input data (e.g., text, video, snapshot, log, etc.) is converted/transform into an executable program/script. There are existing methods to handle multiple kinds of input data, for example, if user attach video, module 230 can analyze the video to extract the sequence of pages (i.e., transform to steps). In another example, if the input data is snapshot then the use of image processing techniques can be utilized which can extract the html elements on the page, and get the input and output values on the pages. Furthermore, if the input data is text then Natural Language Processing techniques can be utilized to analyze the issue description, to extract the steps and issue information.

Generation test scripts refers to test scripts that are used to automatically reproduce the customer's issue. There are several methods to generate the test scripts within a test framework. For example, either using JUnite (https://junit.org/) or jest (https://jestjs.io/) framework, a test script can be created using the service/request as mock data (see FIG. 6 to see a sample script). The method can include, i) follow the execution script, convert user input to the call of Page controller (program element of UI application), ii) follow service request/response sequence, mockup service call function and iii) assert the output or reproduce issue using the result in execution script.

Adjusting service response means that module 230 can, i) analyze more related data sources, ii) prioritize services related with the issue and iii) adjust the service response with a method (e.g., adjust value with specific scope if using service swagger, adjust value following correlation of services if analyzing code, etc.).

Constructing service request/response refers to analyzing the customer's log/steps of their errors/defect complaints and running the execution script. After completing the script, then embodiment can attempt to analyze code for service mapping, collect developer service request/response, compare against customer's result (possibly map and update service response) and redirect service call to data simulator and rerun the steps.

Figure 3A:
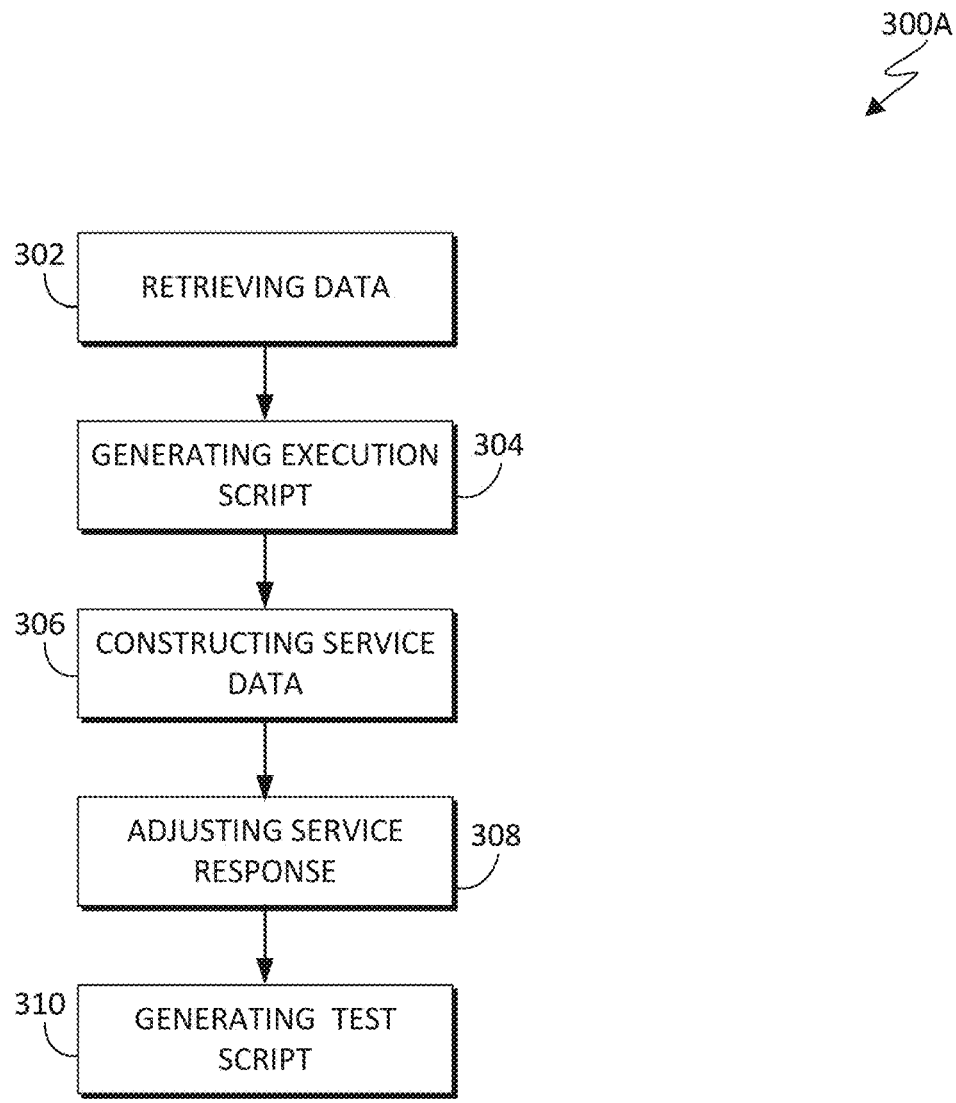
FIG. 3A illustrates a high-level steps of troubleshooting component 111, designated as 300A, in accordance with one embodiment of the present invention.

FIG. 3A illustrates a high-level steps of troubleshooting component 111, in accordance with one embodiment of the present invention.

Troubleshooting component 111 retrieving data (step 302). In an embodiment, troubleshooting component 111, through module 210 and/or module 220, retrieves customer issue data. The data can include text (written issue by the customer), video (recorded by the customer, snapshots, voice and logs (sent by the customer). Data can come directly from the customer or can be retrieved from a defect queue system that resides on developer device 103 or server 110.

Troubleshooting component 111 generates execution script (step 304). In an embodiment, troubleshooting component 111, through module 230, generates an execution script based on the retrieved data. The execution script is essentially a series of programming languages (see block 504 of FIG. 5B) used to replicate a customer's issue based on the initial retrieved data. Essentially, the data is converted into an executable program/script (via module 230). A sample of an execution script can be found as 503 of FIG. 5.

Troubleshooting component 111 constructs service (step 306). In an embodiment, troubleshooting component 111, through module 230, begin to construct the service data by running the execution script (from previous step). Essentially, this involves, i) analyzing the code to get mapping between UI element and service property and ii) collecting developer's service request/response, ii) observing the result of the customer's data, iii) comparing developer's UI result with customer's result and updating the simulated response based on the mapping and iv) redirecting the service call to a data simulator (replay constructed response), and run this step again until the customer's issue is replicated. It is noted that the above steps can be referred to blocks 405-408 of FIG. 4.

Troubleshooting component 111 adjusts service response (step 308). In an embodiment, troubleshooting component 111, through module 230, adjust the service response and run the execution step again. Essentially, this involves, i) analyzing more related data sources, ii) prioritizing services related with the issue and iii) adjusting the service response. Regarding data sources, this can include, but it is not limited to, service code (i.e., service swagger), client code (i.e., data related branch condition and page parameter) and test case (i.e., test data for related issue). Regarding prioritizing service, this means that services, such as, but is not limited to, i) services to handle UI request ii) services which response are populated to the issue page and iii) services near the issue page. Regarding methodology to adjust service, this can include, but is not limited to, i) analyze service swagger, adjust value within specific scope, ii) analyze code, adjust value following the correlation of services, iii) simulate service error, iv) trying boundary value and v) manual inputs.

Troubleshooting component 111 generates test script (step 310). In an embodiment, troubleshooting component 111, through module 230, generates test script with service mockup data. Essentially, troubleshooting component 111 can create a test script by injecting a generated service/request response by utilizing a test framework. The test script is used to automatically reproduce the issue and the test script can be further enhance to be used in regression testing. A sample of a test script can be found as 701 of FIG. 7.

Figure 3B:
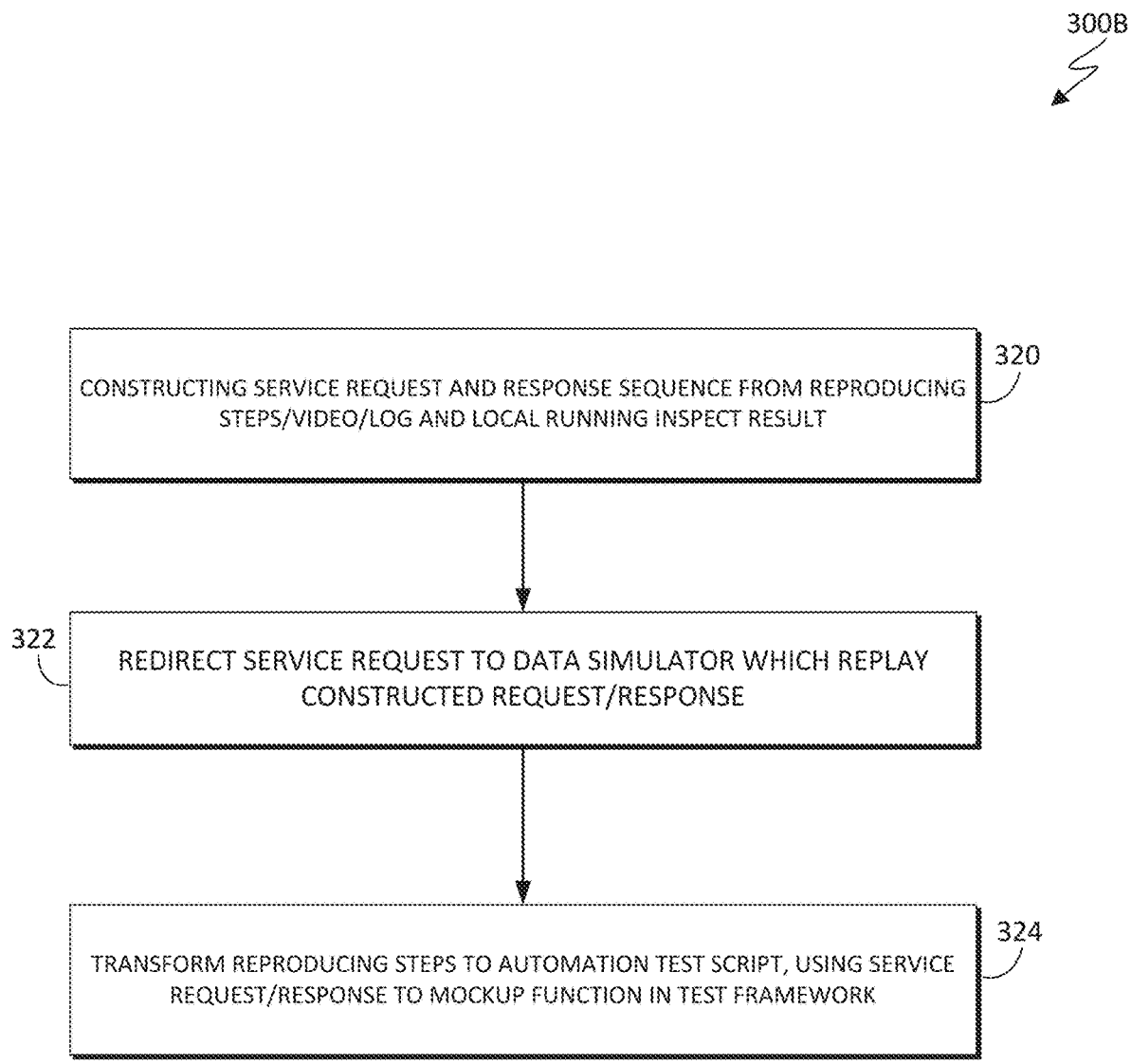
FIG. 3B illustrates a high-level steps of troubleshooting component 111, designated as 300B, in accordance with another embodiment of the present invention.

FIG. 3B illustrates a high-level steps of troubleshooting component 111, in accordance with another embodiment of the present invention. The steps includes block 320, block 322 and block 324. Block 320 denotes the first step of the invention by constructing service request/response from reproducing the customer's data (e.g., steps, videos, logs, etc.) and observing the results of the reproduction of customer's issues. It is noted that block 320 corresponds with at least, block 401, block 402, block 405, block 406 and block 407 of FIG. 4.

Block 322 denotes the second step of redirecting service request to a data simulator which replays the constructed request/response. It is noted that block 322 corresponds with at least, block 408 of FIG. 4.

Block 324 denotes the step of transforming the reproducing steps to an automated test script. It is noted that block 324 corresponds with at least, block 403, block 404, block 409, block 410 and block 411 of FIG. 4.

Figure 4:
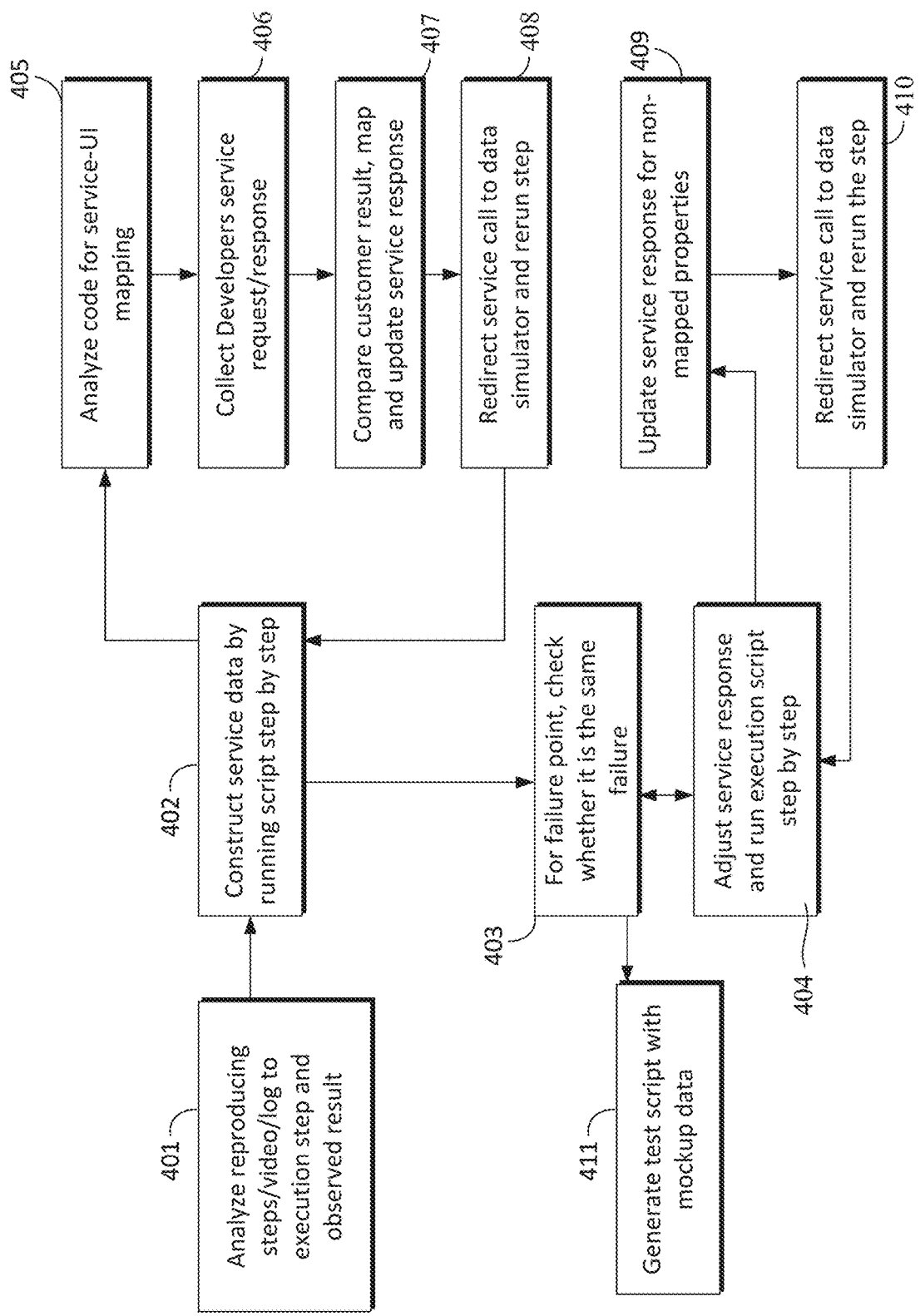
FIG. 4 illustrates high-level steps of reproduction and test module 230 of troubleshooting component 111, in accordance with one embodiment of the present invention.

FIG. 4 illustrates the functionality and capability of troubleshooting component 111, in accordance with one embodiment of the present invention. The steps of block 401 through block 411 can be summarized by the following key points:

1) Analyze reproducing steps/video/log, generate execution script and observed the result (block 401).
2) Run an execution script (block 402) and for each step (block 405-408):
   Analyze code to get mapping between UI element and service property
   Collect developer's service request/response, compare developer's UI result with customer's result (described in reproducing steps/video/log), update simulated response based on the mapping
   Redirect service call to data simulator (replay constructed response), and run this step again.
3) When the execute script reaches a failure point (block 403 through block 404 and block 409 through block 410): If the result of the scrip receives the same issue with reported issue then this final step is deemed completed. Otherwise, from last to the beginning step, for the services not mapped with UI, then simulate error response and rerun the step.
4) Generate test script based on mockup data (block 411).

Blocks 405 ("Collect developer service request/response") can include the following example script using devTools:
   collect initial <request,response> in devTools
   •/project:[{projectId:1, projectName:pump project}]
   /configuration:[{key:maxValue,  value:100},{key:timeout, value:300}]
   •/query: [{documentId:11ab-xx21, name:test},{documentId:11s2-xx19, name:bank}]
   /images/11ab-xx21:stream
   /images/11s2-xx19: stream
   •/download/11 s2-xx19: stream Blocks 407 ("Compare customer result, map and update service response") can include the following example:
   compare customer UI and update <request,response>
   •/project:[{projectId:1, projectName:default}]
   /configuration:[{key:maxValue,  value:100},{key:timeout, value:300}]
   •/query:[{documentId:11ab-xx21, name:exercise},{documentId:11 s2-xx19, name: member-train},{documentId:ab-1,
   name:testnewwo1},{documentId:ab-2,
   name: ㆆ ㆆ ㅐ—ㅍ—ㅗ—ㄴ
   /images/11ab-xx21: stream
   /images/11s2-xx19: stream It is noted that the above scripts are illustrated using JSON but any software development tools and/or programming languages may be utilized.

Figure 5:
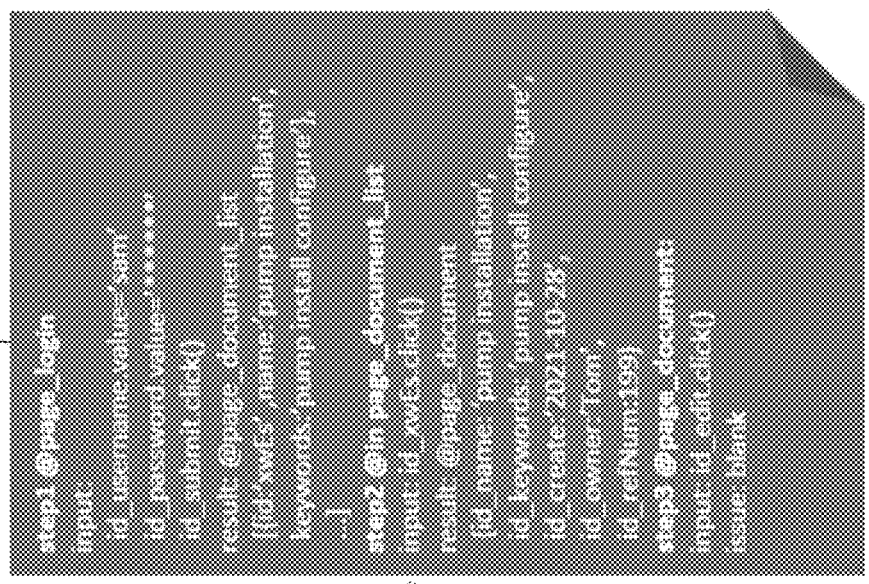
FIG. 5 illustrates an example of reproducing customer's issue which is part of generating an execution script, in accordance with an embodiment of the present invention.

FIG. 5 illustrates an example of reproducing customer's issue (block 502 and block 503) which is part of generating an execution script (block 503 in FIG. 5), in accordance with an embodiment of the present invention. This example corresponds to block 401 of FIG. 4. Block 502 represents a customer's complaint about an issue related to an application (already in a queue system of bugs to be corrected/fixed). The text (from the page) is converted into an execution script (i.e., any flavor programming language) for developers to reproduce (the customer's issue), as illustrated in block 502-503 of FIG. 5. The conversion can be done manually (i.e., by a developer) or automatically by an existing technique known in the art such as a NLP (natural language processing) techniques. Block 504 illustrates the execution script. It is noted that data from the client can be downloaded from a defect queue system that is stored on either developer device 103 or server 110.

Figure 6:
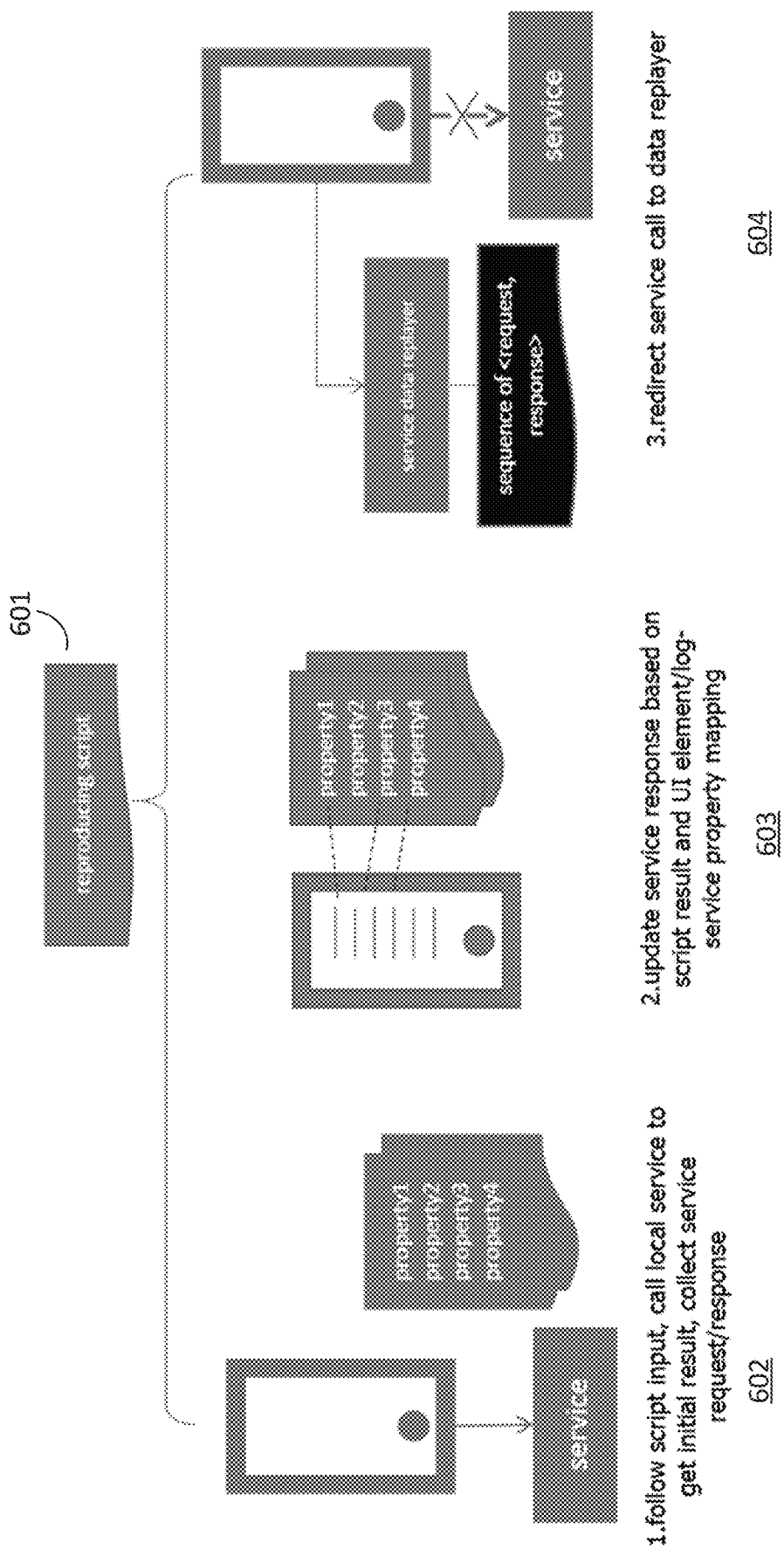
FIG. 6 illustrates an example of reproducing the script from FIG. 5 which is part of constructing service request/response, in accordance with an embodiment of the present invention.

FIG. 6 illustrates an example of reproducing the script from FIG. 5 which is part of constructing service request/response, in accordance with an embodiment of the present invention. Blocks 601, 602, 603 and 604 corresponds to block 402 and blocks 405-408 of FIG. 4.

In some embodiments, steps of troubleshooting component 111 can be summarized by the following clauses:

1. Use existing techniques to analyze reproducing steps/snapshot/video/log, generate execution script and observed result.
2. Run execution script in emulator step by step. Use inspection tool such as devtools to collect developer's service request/response, compare developer's UI result with customer's observed result, analyze UI-service mapping from code, update inspected response based on the mapping, redirect service call to data simulator (replay constructed response) and rerun the step.
3. Check whether reproduce the issue when execute to the given step. If not, analyze multiple data sources and apply multiple policies to adjust service response and rerun the step. The data sources include but not limit to service swagger, branches in client code and test cases. The policies include boundary values, branch values, explicit error and others.
4. Use the constructed service request and response to mockup service call and transform reproducing steps to automatic test script.
5. Generate the automatic test script.

Figure 7:
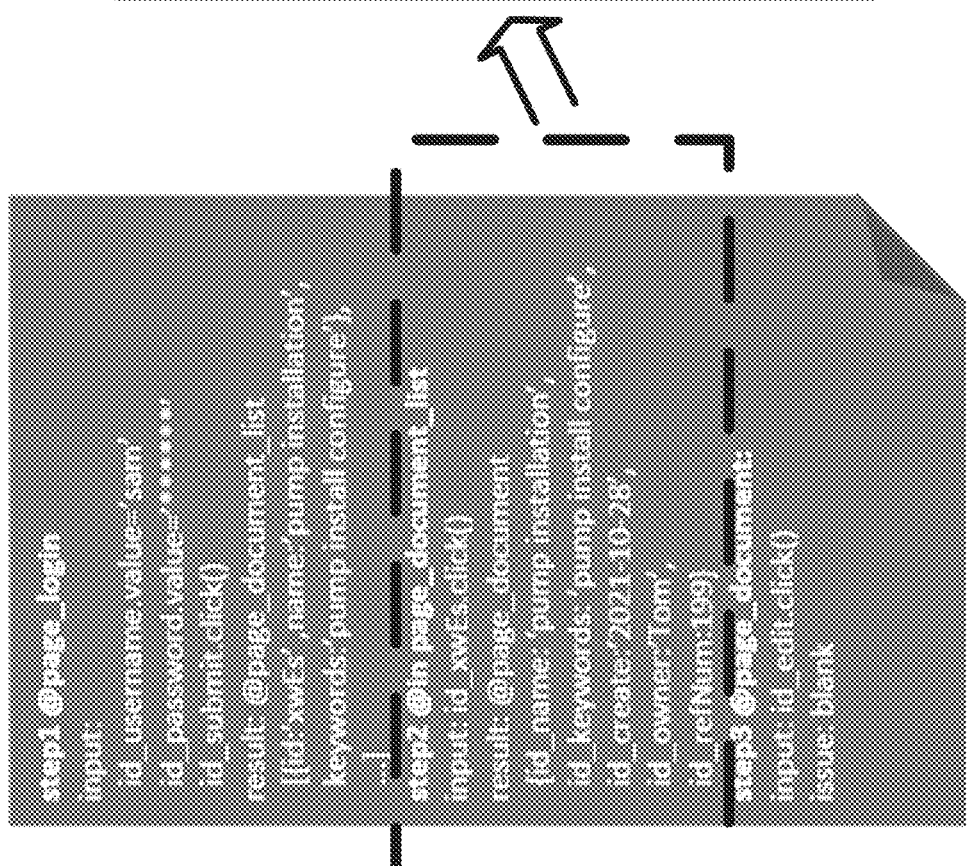
FIG. 7 illustrates an example of converting an execution script into a test script, in accordance with an embodiment of the present invention.

FIG. 7 illustrates an example of converting an execution script into a test script, in accordance with an embodiment of the present invention. Here, step2 of the sample execution script (503) is being converted into a test script (701) based on the following steps: i) follow execution script, convert user input to the call of Page controller (program element of UI application), ii) follow service request/response sequence, mockup service call function and iii) assert the output or reproduce issue using the result in execution script.

Figure 8:
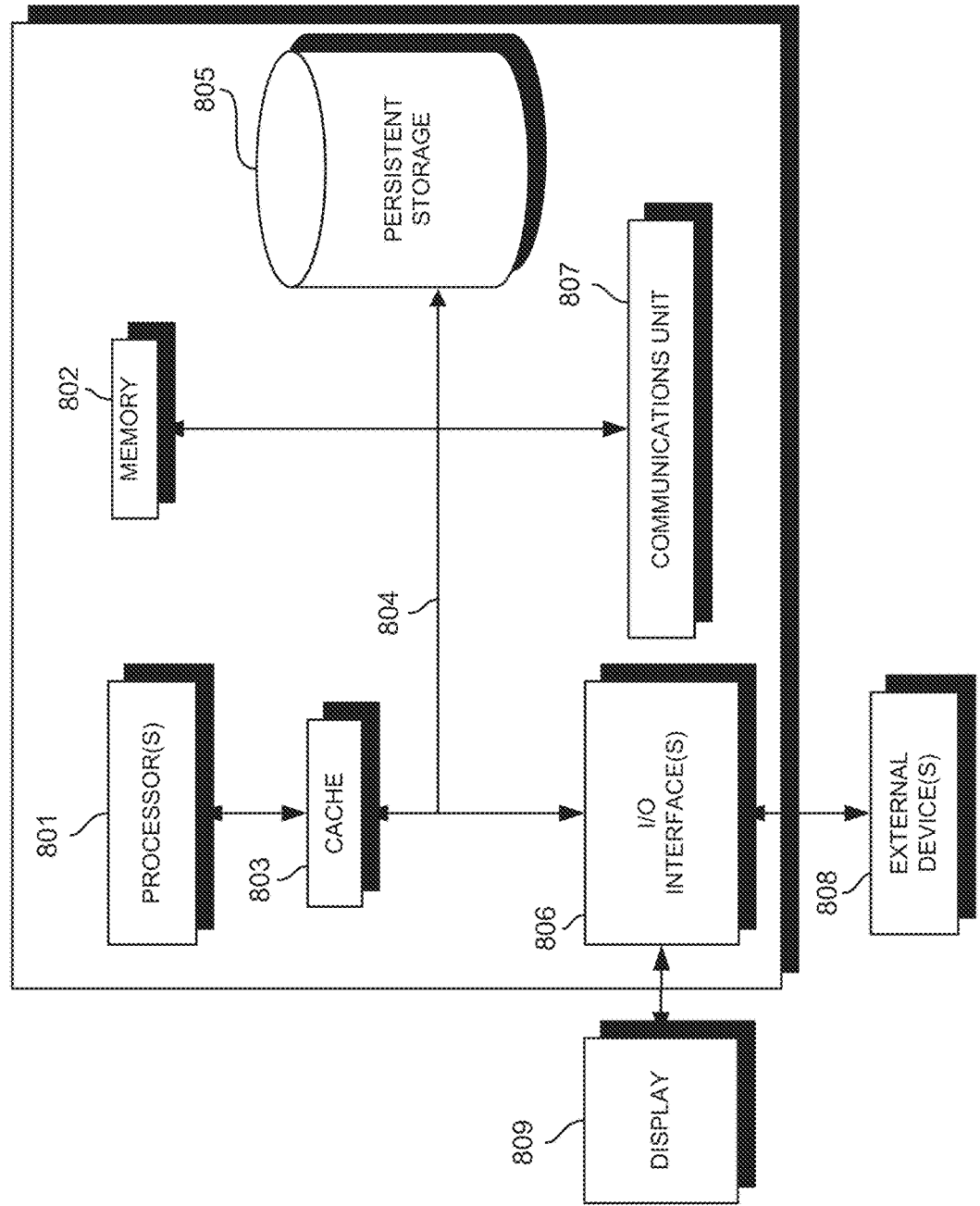
FIG. 8 depicts a block diagram, designated as 800, of components of a server computer capable of executing the troubleshooting component 111 within the troubleshooting environment 100, in accordance with an embodiment of the present invention.

FIG. 8, designated as 800, depicts a block diagram of components of troubleshooting component 111 application, in accordance with an illustrative embodiment of the present invention. It should be appreciated that FIG. 8 provides only an illustration of one implementation and does not imply any limitations with regard to the environments in which different embodiments may be implemented. Many modifications to the depicted environment may be made.

FIG. 8 includes processor(s) 801, cache 803, memory 802, persistent storage 805, communications unit 807, input/output (I/O) interface(s) 806, and communications fabric 804. Communications fabric 804 provides communications between cache 803, memory 802, persistent storage 805, communications unit 807, and input/output (I/O) interface(s) 806. Communications fabric 804 can be implemented with any architecture designed for passing data and/or control information between processors (such as microprocessors, communications and network processors, etc.), system memory, peripheral devices, and any other hardware components within a system. For example, communications fabric 804 can be implemented with one or more buses or a crossbar switch.

Memory 802 and persistent storage 805 are computer readable storage media. In this embodiment, memory 802 includes random access memory (RAM). In general, memory 802 can include any suitable volatile or non-volatile computer readable storage media. Cache 803 is a fast memory that enhances the performance of processor(s) 801 by holding recently accessed data, and data near recently accessed data, from memory 802.

Program instructions and data (e.g., software and data x10) used to practice embodiments of the present invention may be stored in persistent storage 805 and in memory 802 for execution by one or more of the respective processor(s) 801 via cache 803. In an embodiment, persistent storage 805 includes a magnetic hard disk drive. Alternatively, or in addition to a magnetic hard disk drive, persistent storage 805 can include a solid state hard drive, a semiconductor storage device, a read-only memory (ROM), an erasable programmable read-only memory (EPROM), a flash memory, or any other computer readable storage media that is capable of storing program instructions or digital information.

The media used by persistent storage 805 may also be removable. For example, a removable hard drive may be used for persistent storage 805. Other examples include optical and magnetic disks, thumb drives, and smart cards that are inserted into a drive for transfer onto another computer readable storage medium that is also part of persistent storage 805. Troubleshooting component 111 can be stored in persistent storage 805 for access and/or execution by one or more of the respective processor(s) 801 via cache 803.

Communications unit 807, in these examples, provides for communications with other data processing systems or devices. In these examples, communications unit 807 includes one or more network interface cards. Communications unit 807 may provide communications through the use of either or both physical and wireless communications links. Program instructions and data (e.g., troubleshooting component 111) used to practice embodiments of the present invention may be downloaded to persistent storage 805 through communications unit 807.

I/O interface(s) 806 allows for input and output of data with other devices that may be connected to each computer system. For example, I/O interface(s) 806 may provide a connection to external device(s) 808, such as a keyboard, a keypad, a touch screen, and/or some other suitable input device. External device(s) 808 can also include portable computer readable storage media, such as, for example, thumb drives, portable optical or magnetic disks, and memory cards. Program instructions and data (e.g., troubleshooting component 111) used to practice embodiments of the present invention can be stored on such portable computer readable storage media and can be loaded onto persistent storage 805 via I/O interface(s) 806. I/O interface(s) 806 also connect to display 809.

Display 809 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

The corresponding structures, materials, acts, and equivalents of all means or steps plus function elements in the claims below are intended to include any structure, material, or act for performing the function in combination with other claimed elements, as specifically claimed. The description of the present invention has been presented for purposes of illustration and description, but is not intended to be exhaustive or limited to the invention in the form disclosed. Many modifications and variations will be apparent to those of ordinary skills in the art without departing from the scope and spirit of the invention. The embodiments are chosen and described in order to best explain the principles of the invention and the practical application, and to enable others of ordinary skills in the art to understand the invention for various embodiments with various modifications, as are suited to the particular use contemplated.

What is claimed is:

1. A computer-implemented method for troubleshooting customer related issues associated with a software application, the computer-method comprising: retrieving customer data, wherein the customer data further comprises text, video, snapshots, voice, and log; generating execution script based on retrieved customer data; constructing service data based on the execution script; adjusting service response based on the service data; and generating test script based on the service response.

2. The computer-implemented method of claim 1, wherein generating the execution script further comprises:
    converting text from the customer data via NLP (natural language processing) into an executable program.

3. The computer-implemented method of claim 1, wherein constructing the service data further comprises:
    analyzing the software code of the software application for servicing mapping;

collecting developer service request/response;
comparing the collected developer service request/response against result of the customer; and
redirecting service call to a data simulator.

4. The computer-implemented method of claim 1, wherein adjusting service response further comprises:
analyzing related data sources to the data;
prioritizing services related with the customer related issues; and
adjusting the service response via adjustment method.

5. The computer-implemented method of claim 4, wherein adjustment method further comprises of adjusting value with a specific scope if using service swagger and adjusting the value following correlation of services if analyzing code.

6. The computer-implemented method of claim 4, wherein related data sources further comprises of service code, client code and test case.

7. A computer program product for troubleshooting customer related issues associated with a software application, the computer program product comprising: one or more computer readable storage media and program instructions stored on the one or more computer readable storage media, the program instructions comprising: program instructions to retrieve customer data, wherein the customer data further comprises text, video, snapshots, voice, and log; program instructions to generate execution script based on retrieved customer data; program instructions to construct service data based on the execution script; program instructions to adjust service response based on the service data; and program instructions to generate test script based on the service response.

8. The computer program product of claim 7, wherein program instructions to generate the execution script further comprises:
program instructions to convert text from the customer data via NLP into an executable program.

9. The computer program product of claim 7, wherein program instructions to construct the service data further comprises:
program instructions to analyze the software code of the software application for servicing mapping;
program instructions to collect developer service request/response;
program instructions to compare the collected developer service request/response against result of the customer; and
program instructions to redirect service call to a data simulator.

10. The computer program product of claim 7, wherein adjusting service response further comprises:
program instructions to analyze related data sources to the data;
program instructions to prioritize services related with the customer related issues; and
program instructions to adjust the service response via adjustment method.

11. The computer program product of claim 10, wherein adjustment method further comprises of adjusting value with a specific scope if using service swagger and adjusting the value following correlation of services if analyzing code.

12. The computer program product of claim 10, wherein related data sources further comprises of service code, client code and test case.

13. A computer system for troubleshooting customer related issues associated with a software application, the computer system comprising: one or more computer processors; one or more computer readable storage media; and program instructions stored on the one or more computer readable storage media for execution by at least one of the one or more computer processors, the program instructions comprising: program instructions to retrieve customer data, wherein the customer data further comprises text, video, snapshots, voice, and log; program instructions to generate execution script based on retrieved customer data; program instructions to construct service data based on the execution script; program instructions to adjust service response based on the service data; and program instructions to generate test script based on the service response.

14. The computer system of claim 13, wherein program instructions to generate the execution script further comprises:
program instructions to convert text from the customer data via NLP into an executable program.

15. The computer system of claim 13, wherein program instructions to construct the service data further comprises:
program instructions to analyze the software code of the software application for servicing mapping;
program instructions to collect developer service request/response;
program instructions to compare the collected developer service request/response against result of the customer; and
program instructions to redirect service call to a data simulator.

16. The computer system of claim 13, wherein adjusting service response further comprises:
program instructions to analyze related data sources to the data;
program instructions to prioritize services related with the customer related issues; and
program instructions to adjust the service response via adjustment method.

17. The computer system of claim 16, wherein adjustment method further comprises of adjusting value with a specific scope if using service swagger and adjusting the value following correlation of services if analyzing code.

18. The computer system of claim 16, wherein related data sources further comprises of service code, client code and test case.

* * * * *